Oct. 30, 1934.  E. HAZELL  1,978,796

METHOD AND APPARATUS FOR THE MANUFACTURE OF RUBBER THREAD

Filed Nov. 18, 1932

INVENTOR
EARDLEY HAZELL
BY
ATTORNEY

Patented Oct. 30, 1934

1,978,796

UNITED STATES PATENT OFFICE 1,978,796

METHOD AND APPARATUS FOR THE MANUFACTURE OF RUBBER THREAD

Eardley Hazell, New York, N. Y., assignor to National India Rubber Company, Providence, R. I., a corporation of Rhode Island Application November 18, 1932, Serial No. 643,176

4 Claims. (Cl. 18—8)

This invention relates to the manufacture of rubber thread, and has for an object the continuous and rapid production of rubber thread in a simple and inexpensive manner from a suitable aqueous dispersion of rubber, such as rubber latex.

Other objects and advantages will appear from the following description, reference being made to the accompanying drawing illustrating a certain present preferred form of practicing the invention, in which—

Figure 1:
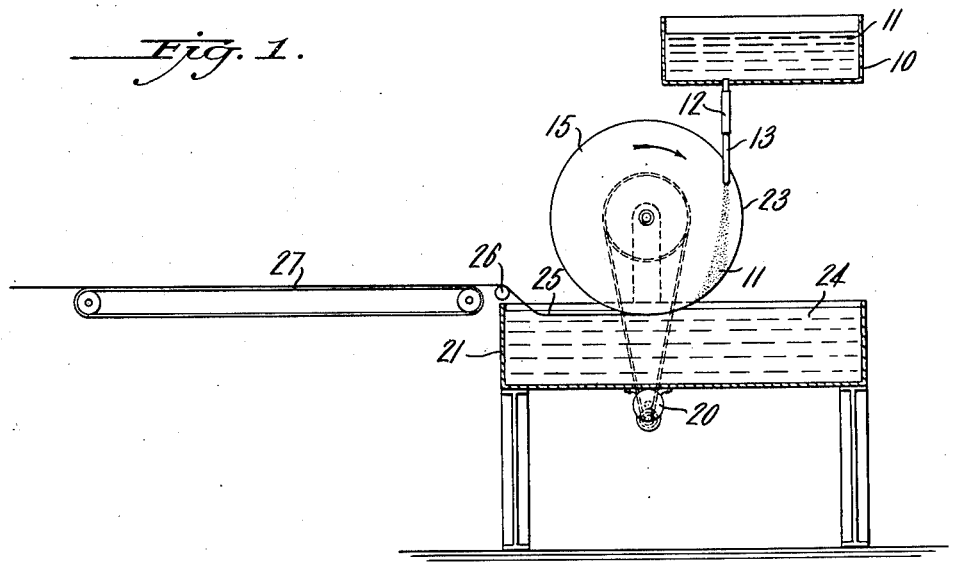
Figure 2:
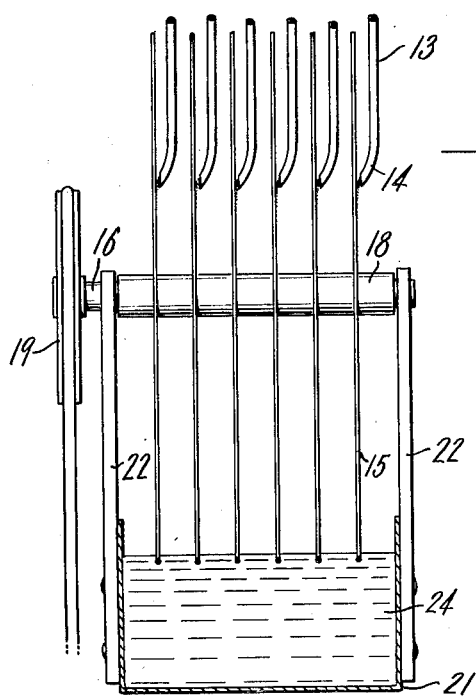

Figure 1 is a side elevation more or less diagrammatically illustrating an apparatus and method embodying and carrying out the invention; and Figure 2 is a detail front elevation of the thread forming part of the apparatus of Fig. 1.

Referring to the drawing, the numeral 10 designates a reservoir for an aqueous dispersion of rubber 11, such as natural latex containing vulcanizing ingredients, so that on subsequent drying and heating of rubber thread formed from it, the thread may become vulcanized. The latex is led from the reservoir through hose connections 12 to a series of vertical latex feed pipes 13. The exit ends 14 of the feed pipes 13 are curved toward and are situated adjacent a series of spaced flat circular discs 15 mounted for rotation on shaft 16 and separated by spacers 18, the shaft being rotated by means of a pulley 19 driven from a motor 20. The shaft 16 is held in horizontal position above a tank 21 by means of brackets 22 attached to the side of the tank and at such a height that the edges 23 of the rotating discs extend slightly below the surface of a coagulant 24 in the tank 21.

The exit ends 14 of the feed pipes 13 are situated adjacent the rotary surfaces of the discs preferably toward the circumferences, as shown so that the rotation of the discs together with the gravity flow of the latex down the surfaces will provide steady streams of latex at only the edges of the discs at the points where the edges meet and extend below the surface of the coagulant 24 in the tank 21.

The latex 11 which is carried to the edges 23 of the discs 15 is coagulated on the submerged edges as the discs rotate, and continuous lengths 25 of coagula are drawn away from the submerged portions of edges 23 through the coagulant 24, over a roller 26 at one end of the tank 21 onto a travelling belt 27, and then to the desired drying and vulcanizing chambers.

In operation, latex is fed from the reservoir 10 to the surfaces of the rotating discs 15 through pipes 13, the exit ends 14 of which are adjacent the surfaces of the rotating discs toward the circumferences. One feed pipe 13 delivering latex to each disc 15 has been found very satisfactory, although more than one feed pipe on the same or opposite surfaces of the rotating discs may be used, if desired. The flow of latex through the pipes 13 may be regulated to give the optimum delivery to the surface of the disc by regulating the height of the reservoir, the column of latex feed, and the internal size of the hose connections 12 by pinch-cocks or other means. The speed of rotation of the discs may be regulated as well as the latex feed to obtain the desired results. The latex flows down the surfaces of the rotating discs to the edges of the same so that at the points where the edges of the disc extend below the surface of the coagulant the streams of latex are confined to the edges, and the coagula formed are withdrawn from the edges in the form of continuous threads through and out of the coagulant at the desired speed over roller 26 by travelling belt 27, and carried from the tank to subsequent drying and vulcanizing operations.

It is, of course, obvious that the viscosity of the latex, the rate of flow of the latex through the feed pipes, the position of the feed pipes, the depth to which the edges of the discs extend below the surface of the coagulant, the composition of the latex with reference to the various compounding ingredients, the rate of withdrawal of the coagulum, and the length of travel through the bath may be varied as desired. The latex may be vulcanized, or it may be unvulcanized, with or without vulcanizing ingredients added thereto. If a vulcanized thread is desired, it may be obtained by compounding the latex with suitable ingredients as described above and drying and vulcanizing the filamentary coagulum; or it may be formed from a vulcanized latex, in which case drying alone of the filamentary coagulum will produce a vulcanized thread; or a thread formed from unvulcanized latex without vulcanizing ingredients may be subjected to the action of vulcanizing liquids or vapors, or to solutions containing vulcanizing ingredients. The latex may be made heat sensitive by methods well known in the art and the latex streamed into a hot coagulant in the manner above described.

The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art.

The tank for the coagulant liquid may take the form of a series of troughs and the coagulant in the tank or troughs may be circulated in the direction of removal of the lengths of coagula, thus utilizing such movement of the coagulant to aid in withdrawing the lengths of coagula through and out of the coagulant and onto the belt for subsequent drying and other operations.

Various other modifications will be apparent to persons skilled in the art and it is understood that I do not intend to limit myself to the specific improvements as described above except as indicated in the appended claims.

Having thus described my invention, what I claim and desire to protect by Letters Patent is:

1. A process for making rubber thread comprising the steps of forming a continuous length of coagulum by streaming latex down the surface of a rotating disc whose edge extends below the surface of a coagulant, and removing the length of coagulum from the edge below the surface of the coagulant.

2. In an apparatus for making rubber thread, a tank for containing a liquid coagulant for latex, a disc rotating at an angle to the surface of coagulant in the tank and having its edge extending below said surface of the coagulant, and means for supplying latex to the surface of the rotating disc whereby the latex will travel down the surface of the disc to the edge thereof.

3. A process for making rubber thread comprising the steps of introducing latex on the surface of a disc rotating at an angle to and with its edge extending slightly below the surface of a coagulant whereby the latex flows down the surface of the rotating disc to the edge thereof, and removing a continuous length of coagulum from said edge.

4. In an apparatus for making rubber thread, a tank for containing a liquid coagulant for latex, a disc rotating at an angle to the surface of coagulant in the tank and having its edge extending below said surface of the coagulant, means for supplying latex to the surface of the rotating disc whereby the latex will travel down the surface of the disc to the edge thereof, and means for removing a continuous length of coagulum from said edge.

EARDLEY HAZELL.